PHASE-INVERSION CIRCUIT

Filed Nov. 30, 1962 4 Sheets-Sheet 1

INVENTOR.
JOACHIM GRAMBOW
BY Percy P. Lantzy
ATTORNEY

June 28, 1966 J. GRAMBOW 3,258,708

PHASE-INVERSION CIRCUIT

Filed Nov. 30, 1962 4 Sheets-Sheet 2

INVENTOR.
JOACHIM GRAMBOW
BY [signature]
ATTORNEY

PHASE-INVERSION CIRCUIT

Filed Nov. 30, 1962 4 Sheets-Sheet 3

INVENTOR.
JOACHIM GRAMBOW
BY Percy P. Lantzy
ATTORNEY

June 28, 1966 J. GRAMBOW 3,258,708

PHASE-INVERSION CIRCUIT

Filed Nov. 30, 1962 4 Sheets-Sheet 4

INVENTOR.
JOACHIM GRAMBOW
BY [signature]
ATTORNEY

United States Patent Office 3,258,708

Patented June 28, 1966

3,258,708

PHASE-INVERSION CIRCUIT

Joachim Grambow, Eutingen, near Pforzheim, Germany, assignor to International Standard Electric Corporation, New York, N.Y., a corporation of Delaware Filed Nov. 30, 1962, Ser. No. 241,193
Claims priority, application Germany, Dec. 28, 1961, St 18,712
2 Claims. (Cl. 330—65)

This invention relates to a circuit of two output tubes operating in push-pull with an input tube used for phase inversion. Further, it relates to a tube suitable for this circuit, the tube consisting at least of one output system and an input system for phase-inversion.

It is known to design an output stage with three tubes or tube systems, namely with two output tubes which operate as triodes or multi-grid tubes in push-pull, with an input tube, with the aid of which the phase of the tapped A.C. voltage at the preceding stage, usually at a preamplifier, is reversed, having available for modulation of the output tubes two A.C. voltages of equal or nearly equal amplitude and different phase, shifted by 180°.

In the known circuits the input tube, controlled by the preceding stage, is either operated as a cathode or as a plate amplifier, so that at the equal-dimensioned cathode and plate resistors two symmetrical A.C. voltages for both output tubes can be obtained, their phases being unequal and shifted by 180° with respect to each other, and their amplitudes being nearly equal to the amplitude of the input signal of the input tube or that the input tube is "asymmetrically" switched solely as a phase-inversion tube for the A.C. voltage required for the second output tube. For this second kind of circuit hitherto in most cases conventional triodes with a relatively small inverse amplification factor have been used, by means of which a nearly distortion-free phase-inversion was possible only by a very high negative feed-back from the load resistor of the plate circuit to the control grid via a separate network. With suitable dimensioning of the negative feed-back the amplitude of the A.C. voltage tapped at the plate resistor of the phase inversion tube can be made equal to the amplitude of the input A.C. voltage of the phase-inversion tube.

This invention proposes for the conventional phase-inversion circuit in which the input tube operates only one of the two output tubes operating in push-pull, that the cathode and the control grid of this one output-tube are connected to the same A.C. voltages as the corresponding electrodes of the input tube, that the modulation range of the input tube is at least as large as the modulation range of this output tube, and that the product $D \cdot V$, where D is the inverse amplification factor of the electrode succeeding the control grid of the input tube on positive voltage, and V is the amplification of the input tube. The range of the product $D \cdot V$ is between 0.3–1. The input tube can be either a triode or a multi-grid tube. The term "inverse amplification factor" here means the inverse amplification of the plate current through the control grid in triodes or, in case of multi-grid tubes, the inverse amplification to the electrodes on positive potential following the control grid through said control grid itself.

Figure 1:
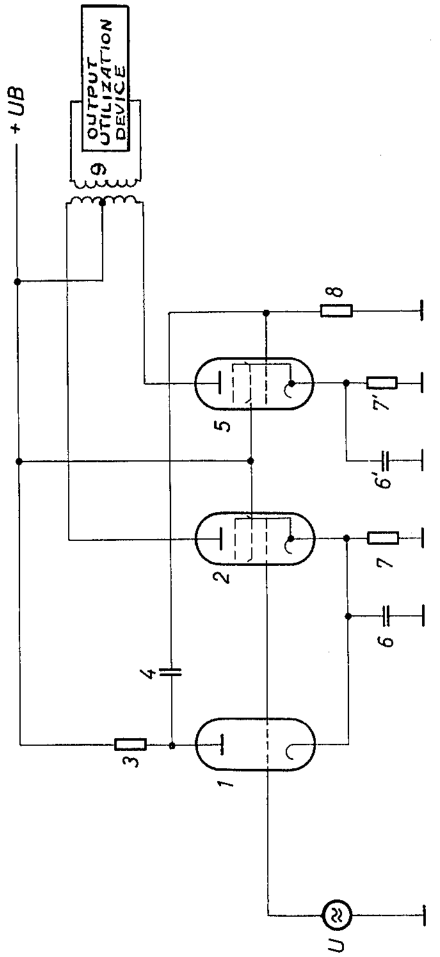

FIG. 1 shows an example of a circuit according to the invention. The input tube 1 is operated with A.C. voltage U. The control grid of the input tube here and in the following designed as a triode, is connected to the control grid of the first output tube 2 (in FIG. 1 shown as an output pentode). At the plate resistor 3 an A.C. voltage will be tapped with a phase shifted by 180° and fed in the usual manner via a coupling capacitor 4 to the control grid of the second output tube 5. The cathodes of the output tube 2 and of the input tube 1 are interconnected and applied to ground via a cathode resistor 7 bridged with a capacitor 6. 8 is the grid leak resistor, 9 the output transformer of the output stage, 6' and 7' are the RC-combination of the second output tube 5.

In the known circuits heavy linearization of the operating characteristic of the input tube occurs automatically through the high negative feed-back. In the arrangement according to the invention an optimum degree of linearity of the operating characteristic can be achieved for predetermined requirements. By specially selecting the ratio of the modulation range of the input tube to the modulation range of the output tube the composition of the harmonics of the output tube 5 and, consequently, the harmonics occurring at the output transformer 9 can be influenced. For the normal push-pull amplifier an optimum ratio of the modulation ranges is between 2.5 and 3.5. In this case the high voltages of the negative half-wave are a little less amplified due to the curving of the characteristic, which leads to a linearization of the operation of the second output tube 5. This instantaneous decrease of amplification is balanced by an instantaneous and correspondingly higher amplification in the second output tube.

The aforementioned advantages are supplemented in that the cathode is grounded with respect to A.C., and that the circuit is of simpler design and more independent of frequency due to the omitted negative feed-back network.

This circuit further has the advantage that simple multi-system tubes can be realized in which, as it will be explained later, the control grids of the input tube and of one output tube and the cathodes of the input tube and of one or of both output tubes are interconnected within the tube.

To obtain a connection between the design of the phase-inversion tube and the non-linear distortion factor the formula applying for the discharging current is used viz.:

$$J_a = C\{U_g + DU_a\}n$$

$J_a$ is the plate current, C represents a constant, $U_g$ and $U_a$ are the instantaneous grid and plate voltages, respectively, D the inverse amplification factor, and $n$ an exponent, which in most cases can be assumed to be 1.50. In case of a sinussoidal operation is $$U_g = U_{go} + \hat{U}_{a\omega} \sin \omega t$$

and for a first approximation $$U_a = U_{ao} - \hat{U}_{a\omega} \sin \omega t$$

whereby the index $o$ indicates the D.C. value and $$\hat{U}_{g\omega} \text{ and } \hat{U}_{a\omega}$$

represent the amplitude of the fundamental wave at the grid and at the plate. In order to simplify the calculation the higher components of $U_a$ $$\hat{U}_{a\nu\omega} \cdot \sin \nu\omega t \text{ with } \nu > 2$$

are neglected which does not principally affect the result of the calculation.

In the first approximation a non-linear distortion K occurs which is in proportion to $$K \sim \frac{\hat{U}_{g\omega}\{1-V \cdot D\}}{\{U_{go}+DU_{ao}\}}$$

K is thereby defined as the geometrical sum of the non-linear distortion factor $K_\nu$ of the individual harmonics, whereby $K_\nu$ in turn is equal to the ratio of the $\nu$th harmonic to the fundamental wave. If the aforementioned approximations are omitted the indicated proportionality remains, except with a multiplicity of additional components.

In order to keep the non-linear distortion factor K small in a predetermined optimum way with reference to the harmonics appearing at the output transformer a phase-inversion tube will be selected as proposed by the invention, viz. with a defined inverse amplification factor so that the product of inverse amplification factor and amplification is nearly unity. Since for a pure phase inversion the amplification should be unity the input tube to be used according to the invention must have an inverse amplification factor which is between 0.3 and 1. (In the case of the hitherto conventional circuits this product of inverse amplification factor times amplification is very much less than 1 and is in most cases below 0.05).

The advantage of this circuit is that the input tube is accommodated together with one or with both output tubes in one tube bulb. Thereby two control grids and the cathodes of the input and of one output tube are interconnected within the bulb. For output tubes either triodes or multi-grid tubes will be used.

Figure 3:
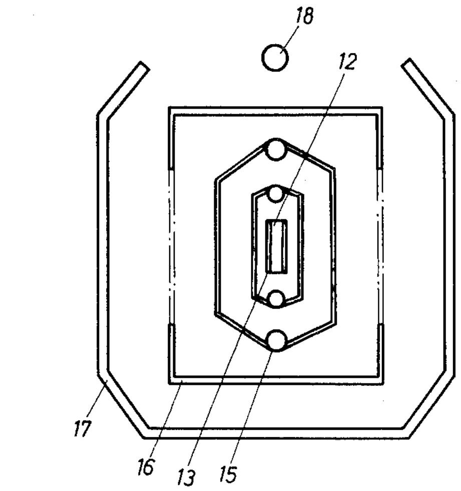
Figure 2:
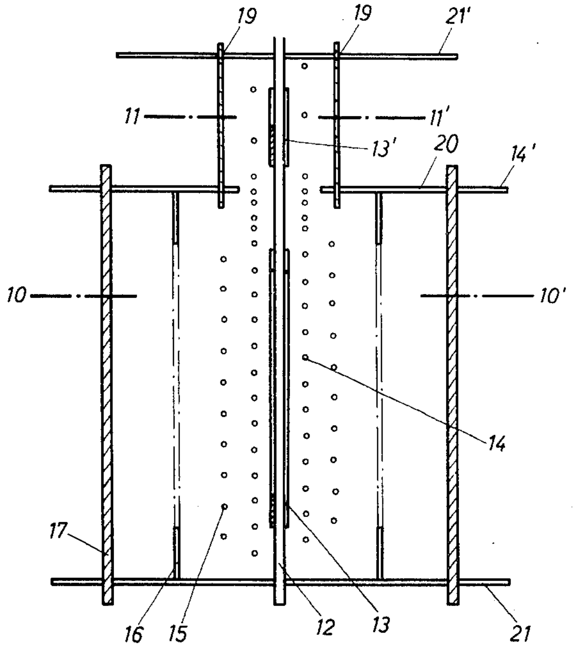
Figure 4:
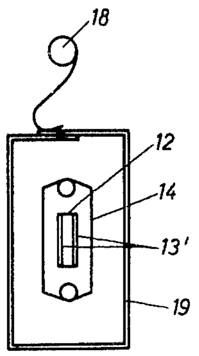

FIGS. 2 to 8 show different designs for one tube according to the circuit of the invention. FIG. 2 shows the longitudinal section. FIGS. 3 and 4 show the transverse section along the line 10–10′ and 11–11′ of FIG. 2. The input system, a triode and one output system, a pentode, possess a common cathode 12 which is coated with the emission compound 13–13′. The cathode is surrounded by the common control grid 14. The differing inverse amplification factors necessary for the input and output systems can be obtained by a varying ascent of the control-grid wires. It may also be possible to wind the control-grid only within the output system and to control the discharging current of the input system by the grid mounting struts. By tight windings 14′ penetration from the triode into the pentode system and vice versa can completely be avoided.

The output tube still possesses, as in the present art, a screening grid 15, a retarding metal sheet 16 and a plate 17, which are embedded in an additional mica disk 20, separating the input and the output system, as the plate 19 of the input system connected to the corresponding base pin via the strut 18. The plate of the input system can be designed either box-shaped or consisting of two metal sheets. The mica disks 21 and 21′ serve for better mounting of the electrodes.

Figure 6:
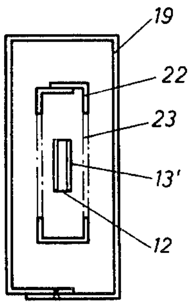
Figure 5:
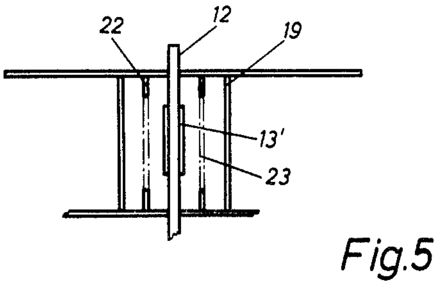

FIG. 5 shows the longitudinal section, FIG. 6 the cross-section of an input system designed as a triode in which the amplification is unity. The triode is controlled here in the known manner through a control metal sheet provided with a control aperture. To have less distortions the control aperture of the metal sheet is made larger than the surface of the cathode covered with emission compound. This is not only required to obtaind a small inverse amplification factor but also to keep the inverse amplification factor practically constant on the surface of the control metal sheet interspersed with emission current.

The control aperture needs not to be designed as shown in the FIGS. 2 to 6; also normal notched or indented grids can be used in which the grid ascent is larger than the length of the cathode covered with emission compound. Furthermore, holding struts, as for example the expanded holding struts of the control grid of one output system, can be used for control. For longer cathodes of the input system a double side limited control aperture is sufficient. In the case of input and output systems arranged one above each other the holding struts of the control grid of the output system can most advantageously be used to control the input system, whereby the output system is located between two mica disks and the input system is mounted on a mica disk as for example the upper one. The grid struts to control the input system may be provided with controlling metal sheets in the shape of cooling ribs or fans.

For phase-inversion with an amplification of unity and for an optimum distortion factor a ratio of 2 to 10 between the control aperture and the emitting cathode surface of the input system is favorable.

Figure 7:
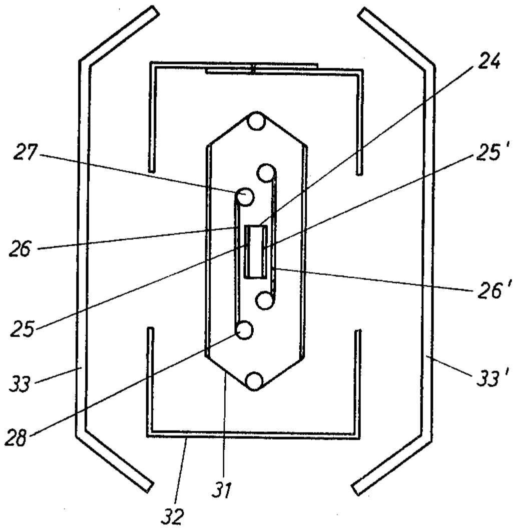
Figure 8:
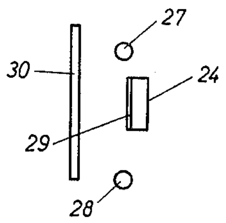

FIGS. 7 and 8 show another example, excelling in utmost simplicity. FIG. 7 represents a cross-section through both output systems and FIG. 8 represents a cross-section through the input system arranged above the output systems with the common cathode 24.

The common cathode 24 will be used in its lower part, the cross-section of which is represented in FIG. 7, with the side covered with emission compound 25–25′ for one of the two output systems, here represented as a pentode. 26 and 26′ are the control grids which in this case are designed as semi-notched or indented grids in the known manner. But also frame grids, as for example, the frame lock grid or the frame notch grid, may be used advantageously. Both holding struts 27 and 28 of the control grid of one system are extended upward into the input system designed as a triode. The cathode sleeve 24 in the input system is covered with an emission compound on one side. 30 is the plate of the triode, 31 and 32 are the common control grids and/or the common retarding metal sheet of the output system. 33 and 33′ are the plates of both output systems.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A phase inversion circuit comprising:
- an input tube;
- two output tubes operating in push-pull;
- a hermetically sealed envelope containing said input tube and at least one of said output tubes;
- a cathode structure disposed in said envelope common to said input tube and said one of said output tubes to directly connect the cathode of said input tube to the cathode of said one of said output tubes;
- a control grid structure disposed in said envelope common to said input tube and said one of said output tubes to directly connect the control grid of said input tubes to the control grid of said one of said output tubes;
- means coupling the plate of said input tube to the control grid of the other of said output tubes; and
- means coupling said cathode structure and the cathode of said other of said output tubes to A.C. ground to thereby couple the cathode of said input tube and the cathodes of both said output tubes to A.C. ground.

2. A phase inversion circuit comprising:
- an input tube;
- two output tubes operating in push-pull;
- a hermetically sealed envelope containing said input tube and both said output tubes;
- a cathode structure disposed in said envelope common to said input tube and both said output tubes constructed to directly connect the cathode of said input tube to at least the cathode of one of said output tubes;
- a control grid structure disposed in said envelope common to said input tube and said one of said output tubes to directly connect the control grid of said input tube to the control grid of said one of said output tubes;

means coupling the plate of said input tube to the control grid of the other of said output tubes; and means coupling said cathode structure to A.C. ground to thereby couple the cathode of said input tube and the cathodes of both said output tubes to A.C. ground.

References Cited by the Examiner

UNITED STATES PATENTS

| | | | |
|---|---|---|---|
| 2,266,531 | 12/1941 | Bedford | 330—118 X |
| 2,619,613 | 11/1952 | Sanger | 330—117 X |
| 2,763,733 | 9/1956 | Coulter | 330—117 X |
| 2,791,642 | 5/1957 | Kobbe | 330—117 X |

FOREIGN PATENTS

| | | |
|---|---|---|
| 699,713 | 11/1953 | Great Britain. |

ROY LAKE, *Primary Examiner.*

NATHAN KAUFMAN, *Examiner.*